Figure 1:
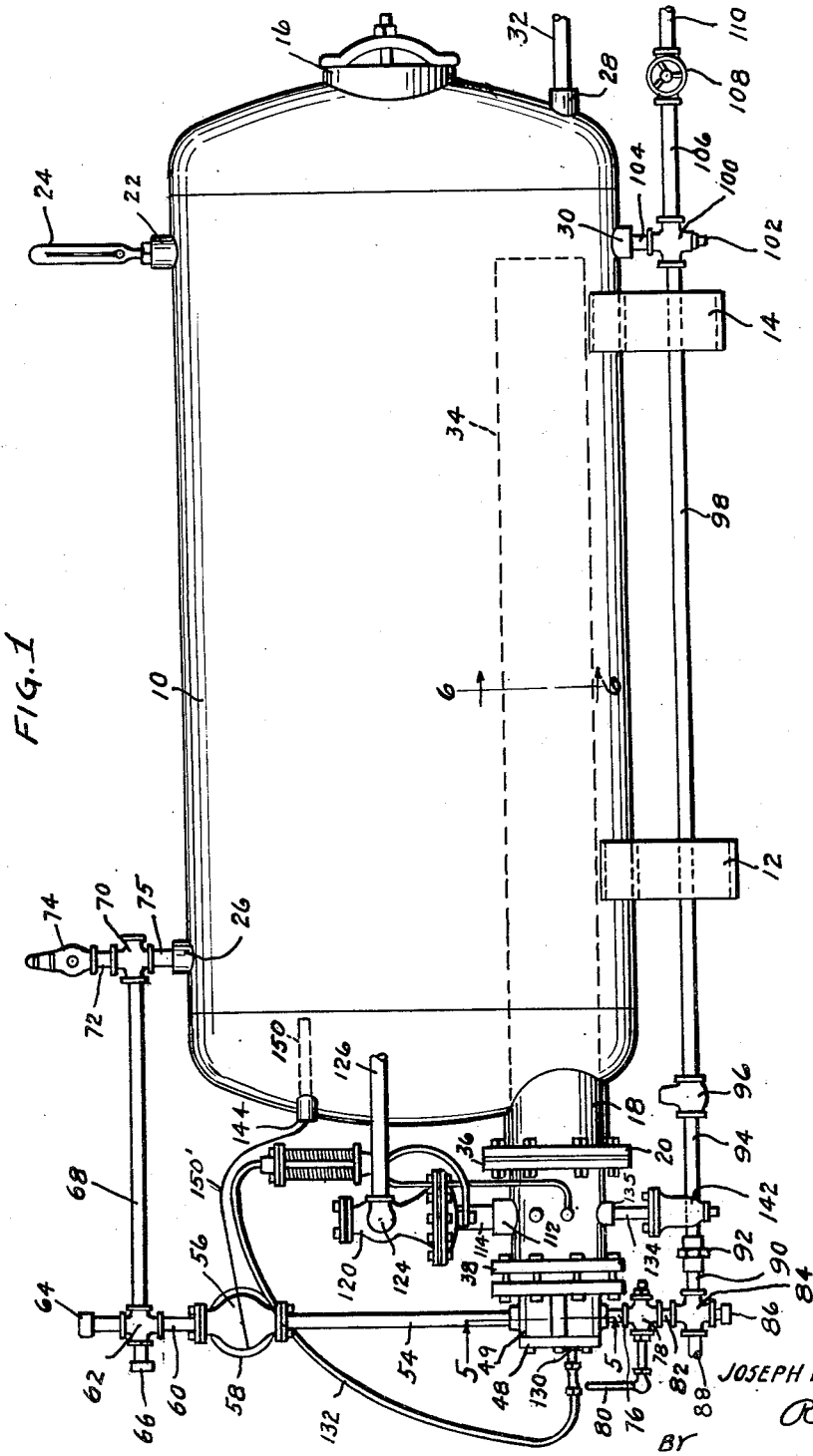

Sept. 11, 1962  J. B. KILLEBREW  3,053,516
HEATING EQUIPMENT

Filed Aug. 8, 1957  3 Sheets-Sheet 1

INVENTOR
JOSEPH B. KILLEBREW
BY Rey Eilers
ATTY.

INVENTOR
JOSEPH B. KILLEBREW
BY Roy Eilers ATT'Y.

Sept. 11, 1962  J. B. KILLEBREW  3,053,516
HEATING EQUIPMENT

Filed Aug. 8, 1957  3 Sheets-Sheet 3

INVENTOR
JOSEPH B. KILLEBREW
BY Rey Eilers ATTY.

United States Patent Office 3,053,516
Patented Sept. 11, 1962

3,053,516
HEATING EQUIPMENT
Joseph B. Killebrew, Kirkwood, Mo., assignor to Killebrew Engineering Corporation, St. Louis, Mo., a corporation of Missouri
Filed Aug. 8, 1957, Ser. No. 676,979
6 Claims. (Cl. 257—313)

This invention relates to improvements in heating equipment. More particularly, this invention relates to improvements in devices that heat water.

It is therefore an object of the present invention to provide an improved device for heating water.

A number of industrial users of hot water "draw" large quantities of hot water for short periods of time, and that water must be at the desired temperature. Customarily that water is heated in one of three basically different types of water heaters: a storage water heater, an instantaneous water heater or a combination water heater. The storage water heater usually consists of a large tank which is directly heated to raise the water therein to the desired temperature; the instantaneous water heater usually consists of heat-exchanging tubes which rapidly transfer heat from the heating medium to the water; and the combination heater usually consists of a storage tank and an instantaneous water heater. The present invention relates to a combination water heater; and it is therefore an object of the present invention to provide an improved combination water heater.

The combination water heater provided by the present invention includes a shell-type instantaneous water heater that is disposed within a storage tank; and it passes water through the storage tank to provide an initial and relatively mild heating of that water and then passes that water through the instantaneous heater to provide the final and relatively intense heating of that water. This arrangement progressively increases the temperature of the water, and it makes certain that the water drawn from the water heater is at the desired temperature. It is therefore an object of the present invention to dispose an instantaneous water heater within a storage tank, to pass water through the tank to effect an initial heating of that water, and to pass that initially heated water through the instantaneous heater to raise that water to the desired temperature.

The inlet opening of the storage tank is disposed at one end, and at the bottom, of that tank; and the outlet opening of that tank is disposed at the opposite end, and at the top, of that tank. The shell of the instantaneous water extends into the storage tank and is disposed so it is between the inlet and outlet openings of that storage tank. As the water passes from the inlet opening to the outlet opening of the storage tank, it will be heated by contacting or passing close to the shell of the instantaneous water heater. Furthermore, that water will be forced to change direction to flow past the shell of the instantaneous water heater; and this changing of direction prevents stratification of the water. The overall result is that the water receives an initial heating as it passes through the storage tank. It is therefore an object of the present invention to provide a combination water heater which has a storage tank with an inlet opening and an outlet opening and which has an instantaneous water heater disposed between those openings.

The combination water heater provided by the present invention has a pump which continuously circulates the water through the storage tank and the instantaneous water heater. As the water leaves the instantaneous water heater it is at its maximum temperature and it will heat the water in the storage tank as it reenters that tank. Continued recirculation of the water through the storage tank and through the instantaneous water heater will raise the temperature of the water in the storage tank to a temperature close to the desired level. Hence, the pump-induced circulation of water makes it possible for all of the water in the combination water heater to be heated during the "build up" periods between the "draw" periods. The "build up" periods may total from five to ten times the lengths of the "draw" periods; and by continuously recirculating the water through the tank and the instantaneous water heater, the present invention fully utilizes the "build up" periods to raise the temperature of the water.

The present invention raises the water, about to be withdrawn from the combination water heater, to its maximum temperature by passing that water through the instantaneous water heater immediately before that water is drawn from the combination water heater. This desirable result is attained by disposing the outlet connection of the combination water heater adjacent the outlet of the instantaneous heater. This means that while the water will be recurrently heated as it is recirculated through the storage tank and the instantaneous water heater, that water will receive its final heating and then pass to the point of usage.

As the water is recirculated through the storage tank and the instantaneous water heater provided by the present invention, that water is heated in two ways. First, it is heated by engaging or flowing past the outer surface of the shell of the instantaneous water heater; and second, it is heated by flowing through the heat exchanging tubes of that heater. In this way, the instantaneous water heater supplies all of the heat supplied to the water; and substantially all of the heat supplied to the instantaneous water heater is utilized to heat the water. The fact that the instantaneous water heater supplies all of the heat to the water plus the fact that the intensive heating of the water is done in the heat-exchanging tubes of the instantaneous water heater is desirable because any deposition of "salts" or "scale" from the water will occur in those heat exchanging tubes where such "salts" or "scale" can easily be removed. In particular, the heat-exchanging tubes can be cleaned by passing a brush through them; and by restricting the deposition of "salts" and "scale" to those tubes the present invention makes it a simple matter to brush out any such "salts" and "scale." The ready removal of the "salts" and "scale" is desirable because it lengthens the life of the combination water heater provided by the present invention and also makes it possible to maintain the thermal efficiency of that heater at a high level.

The instantaneous water heater of the combination water heater provided by the present invention is preferably heated with steam; and a temperature-responsive valve is used to regulate the flow of the steam into the instantaneous water heater. That valve is equipped with a temperature-sensitive bulb; and that temperature-sensitive bulb is disposed within one of the heat-exchanging tubes in the final "pass" of the instantaneous water heater. As a result, that temperature-sensitive bulb is contacted by the water which is ready to be drawn from the combination water heater. This arrangement makes the steam valve fully responsive to the temperature of the water which is critical. It is therefore an object of the present invention to provide a temperature-responsive valve to control the flow of heating medium to the instantaneous water heater and to dispose the temperature-sensitive bulb of that valve within one of the heat-exchanging tubes in the final "pass" of that instantaneous water heater.

The use of a pump to recirculate the water through the storage tank and through the instantaneous water heater makes it possible to use a very small steam valve. Such a valve is desirable because it distributes the demand for steam over the greatest part of the normal operation of the combination water heater, and it thus makes the demand for steam fairly constant. This substantially constant steam demand is desirable because it increases the attainable efficiency of operation of the boiler. In particular, this substantially constant steam demand makes it possible to draw hot water from the combination water heater at surge rates without using an oversize boiler.

The combination water heater provided by the present invention operates on water main pressure, and thus does not require special pressurizing apparatus. While that heater does have a pump, that pump functions to circulate the water; and the introduction of fresh water and the withdrawal of hot water is effected by the water main pressure. This is made possible by providing a check valve intermediate the inlet from the water main and the outlet to the point of usage; that check valve preventing "short circuiting" of the cold water to that point while permitting recirculating of the water to heat that water.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 2:
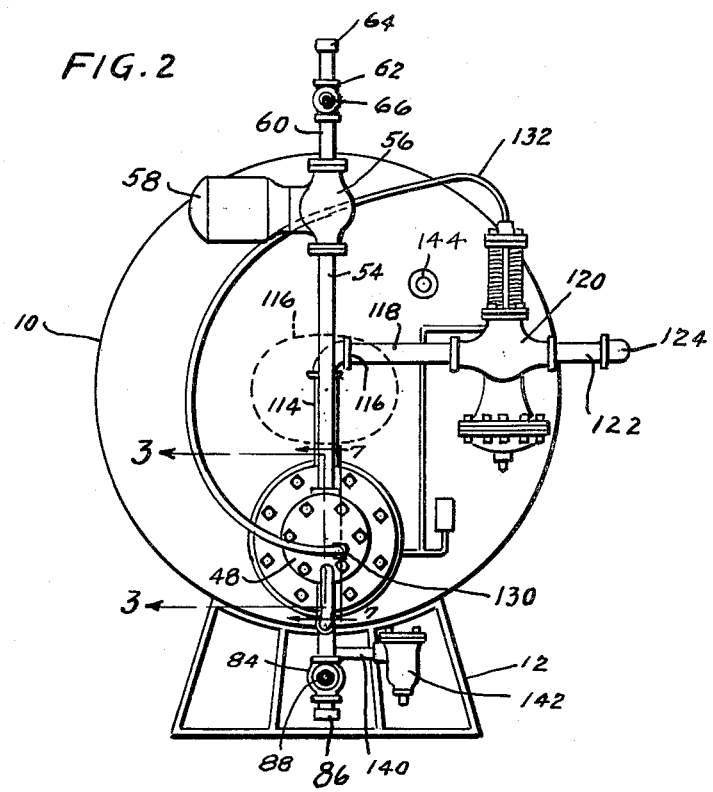
Figure 3:
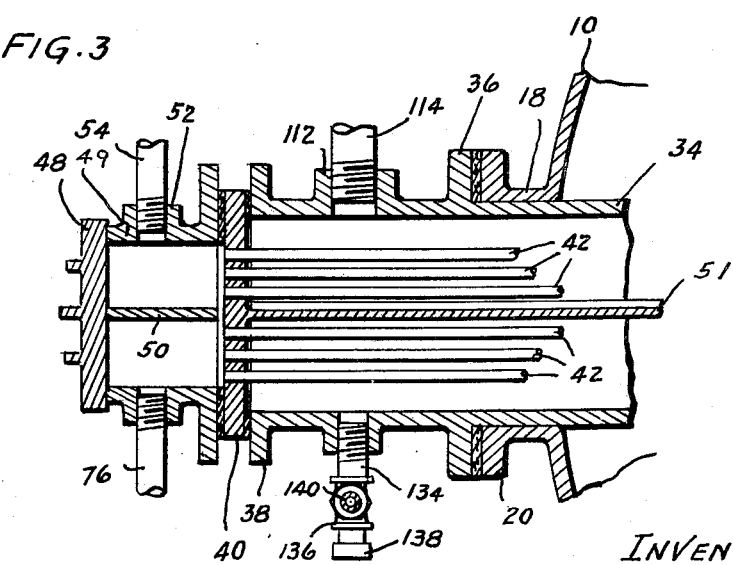
Figure 4:
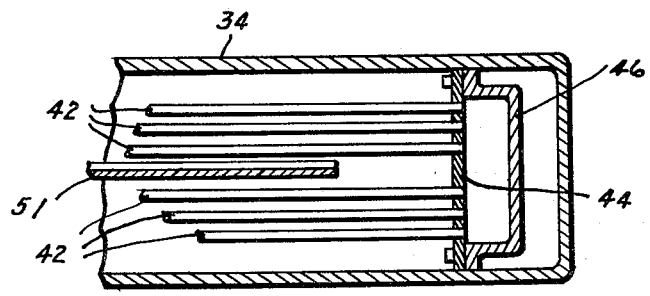
Figure 5:
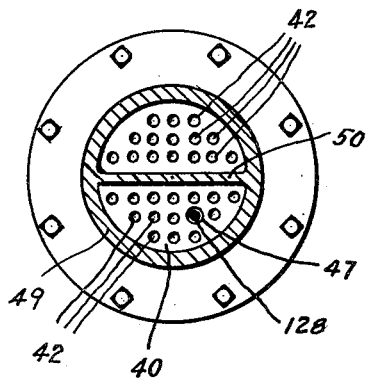
Figure 6:
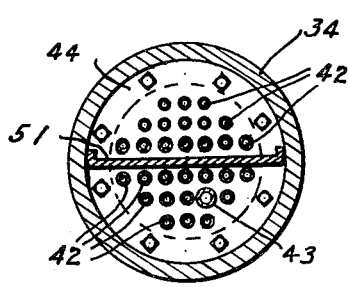
Figure 7:
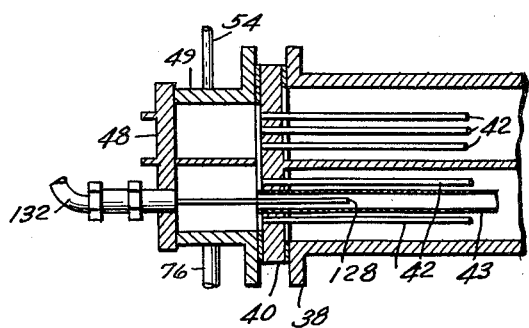

In the drawing,

FIG. 1 is a side elevational view of a combination water heater that is made in accordance with the principles and teachings of the present invention, FIG. 2 is a front elevational view of the combination water heater shown in FIG. 1, FIG. 3 is a sectional view of the combination water heater of FIGS. 1 and 2, and it is taken along the plane indicated by the line 3—3 in FIG. 2, FIG. 4 is a longitudinal section through part of the instantaneous water heater of the combination water heater of FIGS. 1 and 2, FIG. 5 is a sectional view taken along the plane indicated by the line 5—5 in FIG. 1, FIG. 6 is a sectional view taken along the plane indicated by the line 6—6 in FIG. 1, and FIG. 7 is a sectional view taken along the plane indicated by the line 7—7 of FIG. 2.

Referring to the drawing in detail, the numeral 10 denotes a metal storage tank which is made waterproof. That tank has an integrally attached stand 12 at one end thereof and has an integrally attached stand 14 at the other end. The stands 12 and 14 serve as feet for the storage tank 10.

A manway or manhole 16 is provided at the right-hand end of the tank 10, and that opening permits access to the interior of that tank for purposes of checking, maintenance and repair. A tubular opening 18 is provided at the left-hand end of the tank 10, and that opening has a radially extending flange 20.

The interior of the tank 10 is coated with an anti-rusting compound, preferably a thermo-setting phenolic resin. Such a coating can resist corrosion when the tank is empty during storage and shipment, and can also resist corrosion when the tank is filled with water and the water is heated to high temperatures. Such a coating is highly important where the combination water heating device is to be used in food processing plants, laundries and the like.

A boss 22 is provided on the tank 10 adjacent the right-hand end thereof, and that boss is internally threaded to accommodate the threaded lower end of a thermometer 24. That thermometer provides a visual indication of the temperature of the water at the top of the tank 10. The tank 10 is also provided with a boss 26, and that boss is internally threaded to accommodate piping.

An opening 28 is provided in the right-hand end of the tank 10 below the level of the manway 16, and that opening can receive piping connected to a water main. An opening 30 is provided in the bottom of the tank 10 and that opening can accommodate piping.

The numeral 32 denotes a section of piping which is connected to a water main; and that section of piping is secured to the tank 10 so it is in register with, and is in communication with, the inlet opening of tank 10. This section of piping places the tank 10 in continuous communcation with the water main and with the pressure exerted by the water in that main.

The numeral 34 denotes the shell of an instantaneous water heater; and that shell is elongated and has a diameter which is slightly smaller than the inner diameter of the tubular opening 18 of tank 10. The right-hand end of the shell 34 is closed, and the left-hand end of that shell has a radially-extending flange 36 and has a second radially-extending flange 38. The flange 36 is intermediate the right-hand end of the shell 34 and the flange 38 at the left-hand end of that shell. The flange 36 can be placed in register with the flange 20 of the tubular opening 18 of the tank 10, and it can be bolted to it by nuts and bolts. A suitable gasket of annular configuration will be disposed between the confronting faces of the flanges 20 and 36 and will render the joint watertight.

The instantaneous water heater has a tube sheet 40 which is slightly smaller in diameter than the flange 38 of shell 34. Suitably connected to the right-hand face of that tube sheet are a plurality of heat-exchanging tubes 42, and those tubes are preferably made of hard drawn copper so they will not rust and so they are easily cleaned. The right-hand ends of those tubes are secured to a tube sheet 44 which is disposed within the shell 34 and is disposed adjacent the right-hand end of that shell. The tube sheet 40 is provided with an enlarged opening 47; and a large diameter heat-exchanging tube 43 extends between that opening and a corresponding large diameter opening in the tube sheet 44.

A cup-shaped cover plate 46 is secured to the tube sheet 44 by nuts and bolts, and that cover plate is suitably sealed to the tube sheet 44 by a gasket, not shown. A channel 49 is disposed adjacent the outer face of tube sheet 40, and a flange at the right-hand end of that channel is suitably secured to the flange 38 at the left-hand end of the shell 34, by nuts and bolts. Gaskets are interposed between the tube sheet 40 and the flange 38 and between the tube sheet 40 and the channel 49 to render the joint watertight. The left-hand end of the channel 49 is closed by a cover plate 48.

The channel 49 has a horizontal partition 50 therein and that partition divides the heat-exchanging tubes 42 into an initial upper "pass" and a final lower "pass." More specifically, the partition 50 causes the water to move from left to right through the upper group of tubes 42; and that water will move downwardly in the header space provided by closure plate 46 and then move from right to left in the lower group of tubes 42.

A horizontal baffle plate 51 is secured to the right-hand face of the tube sheet 40, and that baffle plate extends toward, but stops short of, the tube sheet 44. That baffle plate is elongated and has elongated flanges at the edges thereof to stiffen it. Those flanges are immediately adjacent the inner surface of the shell 34 and enable the baffle plate 51 to force steam, introduced into the shell 34 adjacent the left-hand end thereof to move toward the right-hand end of that shell before it can return to the left-hand end of that shell. Such an arrangement assures full heating of all parts of the tubes 42.

The numeral 52 denotes a boss which is formed at the top of the channel 49, and that boss accommodates a short length 54 of pipe. That pipe has a radially-directed flange at the upper end thereof and that flange accommodates a complementary flange on a pump 56. The pump 56 is driven by an electric motor 58. The pump 56 has a second flange, and that flange accommodates a complementary flange on a section 60 of pipe. The upper end of the pipe section 60 is threaded, and it extends into one of the threaded openings of a pipe cross 62. The left-hand threaded opening and the top threaded opening of the cross 62 are closed by plugs 66 and 64 respectively. The right-hand opening of the cross 62 accommodates a section 68 of pipe. The right-hand end of the pipe section 68 extends into the left-hand threaded opening of a cross 70. The upper threaded opening of the cross 70 accommodates a short nipple 72 which supports a pressure relief valve 74. The lower threaded opening of the cross 70 accommodates a short nipple 75, and the other end of that nipple is seated in the boss 26 of tank 10. The right-hand threaded opening of the cross 70 can accommodate a plug or can accommodate a piping connection to a faucet for moderately hot water.

The channel 49 also has an opening at the bottom thereof, and that opening accommodates a short nipple 76. A pipe T is threaded onto the bottom of the nipple 76, and a nipple 82 is threaded into the lower end of that T. A thermometer 80 is connected to the remaining opening of the T 78.

A cross 84 is secured to the lower end of the nipple 82, and the bottom opening of that cross receives a plug 86. A section 88 of piping extends from the left-hand threaded opening of the cross 84 to the point of usage, not shown, from which the high temperature hot water can be drawn. A nipple 90 extends from the right-hand threaded opening of the cross 84 to a union 92. A section 94 of pipe extends between the right-hand portion of the union 92 and a check valve 96; and that check valve will permit water to flow from the union 92 through the check valve 96 but will prevent the flow of water in the opposite direction. A section 98 of pipe extends from the check valve 96 to a cross 100. The lower opening of the cross 100 is closed by a plug 102, a short nipple 104 extends from the upper threaded opening of that cross to the opening 30 in the tank, and a nipple 106 extends from the right-hand threaded opening of the cross 100 to a valve 108. A section 110 of pipe extends from the valve 108 to a suitable drain connection.

A boss 112 is provided on the shell 34 at a point intermediate the flanges 36 and 38. That boss is internally threaded and receives a nipple 114. The upper end of the nipple 114 extends into a pipe L 116, and a pipe section 118 is connected to the other side of the L. The pipe 118 extends to a pilot-operated steam valve 120. A nipple 122 is connected to the other side of the steam valve 120 and is connected to a section of pipe 126 by an L 124. The pipe 126 extends to a boiler or other suitable source of steam, not shown.

The numeral 128 denotes a temperature-sensitive bulb which is shown in FIG. 5 and is supported by a plug 130 threaded into an opening in the cover plate 48. The free end of that temperature-sensitive bulb extends through the large diameter opening 47 in the tube sheet 40 and is disposed within the large diameter heat-exchanging tube 43 connected to that large diameter opening. This arrangement places that temperature-sensitive bulb in direct engagement with the water that is ready to be drawn from the instantaneous heater; thereby enabling that temperature-sensitive bulb to give a true indication of the temperature of the water available for use. An elongated flexible tube 132 is integral with the temperature-sensitive bulb 128 and connects that bulb with the steam valve 120.

The numeral 134 denotes a short nipple which extends downwardly from an opening 135 in the shell 34, and that nipple extends to a T 136. The lower end of the T is closed by a plug 138, and a short nipple 140 is connected to the side opening of the T. That nipple extends to an automatic drip trap 142. A suitable steam return line, not shown, will be connected to the outlet of the drip trap 142.

Water from the water main will pass through pipe section 32 and enter the opening 28, and it will fill the tank 10 and then fill the tubes 42 and 43 of the instantaneous water heater. That water will normally be unable to flow out through pipe section 88 because the valve at the load is normally closed.

The motor 58 will normally operate the pump 56 and that pump will draw water up through opening 30, around the outer surface of shell 34, and through pipe sections 68 and 60. That water will be heated as it engage or flows past the shell 34. That water will then be directed downwardly through pipe 54 into the upper part of channel 49; and thereafter it will flow to the right through the upper group of tubes 42, will move downwardly through closure plate 46, and then move to the left through the lower group of tubes 42. That water will then move downwardly through the pipe 76, through nipple 82, through the check valve 96, and through the pipe section 98 to the opening 30. In passing through the heat-exchanging tubes 42, that water will be heated intensely and will experience a rapid rise in temperature.

When high temperature water is to be drawn from the combination water heater, the valve at the load, not shown, in communication with pipe section 88 is opened; and thereupon the pressure of the water in the water main will force additional water into the tank 10 through pipe section 32 and opening 28. That additional water will force the water in the tank 10 to move into the instantaneous water heater and will force the water in the instantaneous water heater to pass to the cross 84 and then through the pipe 88 to the open valve at the load. That water will receive its final heating as it passes through the heat-exchanging tubes 42 and will be raised to the desired temperature.

The heat from the instantaneous water heater is preferably supplied by steam, and that steam is introduced through pipe 126, L 124, nipple 122, steam valve 120, pipe 118, L 116 and pipe 114. That steam will enter the shell 34 and engage the upper group of tubes 42. The baffle plate 51 will force that steam to move to the extreme right-hand end of that baffle plate before that steam can reverse its direction and move along beneath that baffle plate. As the steam moves back to the left, beneath the baffle plate 51, it will engage the lower group of tubes 42. Finally that steam will pass outwardly from the shell 34 through the nipple 134 and enter the automatic drip trap 142. The steam will be under sufficient pressure to enable its temperature to be well above the desired temperature for the high temperature water.

The steam valve 120 will be open whenever the temperature of the water at the opening 47 is below a predetermined level, and it will be closed whenever that temperature reaches that predetermined level. The pump 56 will recirculate the water through the storage tank and the instantaneous water heater and thus make sure that all of the water issuing from tank 10 at boss 26 is hot enough to reach the desired temperature by the time it reaches the left-hand end of the second "pass" through the instantaneous water heater.

If moderately hot water as well as intensely hot water is desired, a piping connection will be provided between the right-hand threaded opening of cross 70 and a second load requiring the moderately hot water. In addition, an immersion-type thermostat 150 will be mounted in heat-receiving relation with the water in tank 10, as for example by being mounted in boss 144 of tank 10; and that thermostat will be arranged to start and stop the motor 58. That thermostat will enable the pump 56 to provide enough circulation of the water through tank 10 and tubes 42 to raise the temperature of the water in that tank to the desired moderately hot temperature.

The load to which the right-hand threaded opening of cross 70 is connected will usually be a load that does not require water at sterilization temperatures. The load to which the pipe 88 is connected, will be a different load, and it will usually be a load that requires water at sterilization temperatures. An important feature of the present invention is its ability to simultaneously supply water at these two different temperatures, to these two different loads. Specifically, the water heater provided by the present invention can simultaneously supply intensely hot water and moderately hot water; the intensely hot water being drawn off through pipe 88 and the moderately hot water being drawn off at cross 70.

Where the water heater of the present invention is to be used as a single source for both intensely hot water and moderately hot water, the water in the tank 10 will not be quite as hot as it is when that water heater is used solely to supply intensely hot water; because the pump 56 does not run continuously. However, the immersion thermostat 150 in boss 144 will keep the pump 56 running long enough and frequently enough to raise the temperature of the water in the tank until that water is moderately hot; and water that is heated to that extent can readily be made intensely hot by a final heating in the tubes 42 of the instantaneous water heater. As a result, both moderately hot water and intensely hot water can be drawn from the water heater provided by the present invention.

The water heater provided by the present invention has a high degree of thermal efficiency, and it is very compact. For example, one embodiment of the combination water heater provided by the present invention can raise water from forty degrees to one hundred and eighty degrees and can deliver twelve thousand gallons of hot water per hour even though it is less than five feet wide, less than eighteen feet long and less than seven and one half feet high.

If any "salts" or "scale" form in the combination water heater provided by the present invention, they will form in the heat-exchanging tubes of the instantaneous water heater because those tubes provide the intensive heating of that water. This is desirable because it restricts the formation and deposition of such "salts" and "scale" to that portion of the combination water heater that is most readily cleaned. All that is needed to clean those tubes is to remove the cover plate 48 and pass brushes through the various tubes to free the "salts" or "scale." Thereafter, any such "salts" or "scale" can be flushed out with a high pressure stream of water from a hose.

If further cleaning, or if checking, of the heat-exchanging tubes 42 and 43 is ever desired, channel 49, those tubes, tube sheets 40 and 44, baffle plate 51, and cover plate 46 can easily be removed from the shell 34 while that shell is fixedly secured to the tank 10. All that need be done is to remove the cover plate 48 and channel 49 and withdraw the assembly of tubes 42 and 43, tube sheets 40 and 44, cover plate 46 and baffle plate 51 from the shell 34. After cleaning or inspection, that assembly is as easily replaced.

Whereas the drawing and accompanying description have shown and described a preferred embodiment of the present invention, it should be apparent to those skilled in the art that various changes may be made in the form of the invention without affecting the scope thereof.

What I claim is:

1. A combination water heater comprising a water storage tank, an instantaneous water heater disposed within the tank, a water inlet in said tank, a water outlet in said tank adjacent the top thereof, a water inlet and a water outlet in said heater, a conduit between said tank outlet and said heater inlet and a second conduit between said heater outlet and said tank inlet whereby water may circulate from said storage tank through said heater and back to the storage tank, a pump in one of said conduits for circulating said water, an outlet for withdrawing intensely hot water from said second conduit, said outlet being adjacent the heater outlet, an opening in said conduit between the storage tank outlet and the heater inlet for withdrawing moderately hot water, a heating medium for said water heater, control means for controlling the supply of heating medium to the heater, a temperature sensitive means in said heater adjacent the outlet thereof responsive to the temperature of the water in said heater for operating said control means, and temperature control means within the storage tank operatively connected to the pump for stopping the pump when moderately hot water is desired.

2. A combination water heater comprising a water storage tank, an instantaneous heater disposed in the lower portion of the tank, a water inlet in said tank, a water outlet in said tank adjacent the top thereof, a water inlet and a water outlet in said heater, a conduit between said tank outlet and said heater inlet and a second conduit between said heater outlet and said tank inlet whereby water may circulate from said storage tank through said heater and back to the storage tank, a pump mounted in the conduit between said tank outlet and said heater inlet for circulating said water, means between the heater outlet and the tank inlet for preventing back-flow of water, an outlet for withdrawing intensely hot water from said second conduit, said outlet being adjacent the heater outlet, an opening in said conduit between the storage tank outlet and the heater inlet for withdrawing moderately hot water, a heating medium for said water heater, control means for controlling the supply of heating medium to the heater, a temperature sensitive means in said heater adjacent the outlet thereof responsive to the temperature of the water in said heater for operating said control means, and temperature control means within the storage tank operatively connected to the pump for stopping the pump when moderately hot water is desired.

3. A combination load leveling water heater comprising a water storage tank, an instantaneous water heater disposed within said tank, a non-combustible heating medium for said heater, a water inlet for said tank, a water outlet for said tank adjacent the top of said tank, a water inlet for said heater, a water outlet for said heater, a conduit between said tank outlet and said heater inlet and a second conduit between said heater outlet and said tank inlet, whereby water may be circulated from said storage tank through said heater and back to said storage tank, a pump in one of said conduits for circulating said water, and thereby maintaining loading of said heating medium, an outlet for withdrawing heated water from said second conduit, said heated water passing through at least part of said storage tank and through all of said heater as it passes to said outlet for heated water, said outlet for heated water being adjacent said heater outlet, a control element for controlling the supply of said heating medium to said heater, and a temperature sensitive element means that is disposed within said heater adjacent said heater outlet responsive to the temperature of the water in said heater to control said control element.

4. A combination load leveling water heater comprising a water storage tank, an instantaneous water heater disposed within said tank, a heating medium for said heater, a water inlet for said tank in the bottom of said tank, a water outlet for said tank adjacent the top of said tank, a water inlet for said heater, a water outlet for said heater, a connection between said tank outlet and said heater inlet whereby the water that issues from said heater and that is to be recirculated will pass into the bottom of said tank, and a second conduit between said heater outlet and said tank inlet whereby the water that issues from the top of said tank and that is to be recirculated will pass into the inlet of said heater, a pump in one of said conduits for circulating said water, and thereby maintaining loading of said heating medium, an outlet for withdrawing heated water from said second conduit, said outlet for heated water being adjacent said heater outlet, said heater isolating said heating medium from the water recirculating through said tank and said heater while transferring heat from said heating medium to said water, a control element for controlling the supply of said heating medium to said heater, and a temperature sensitive element disposed within said heater responsive to the temperature of the water in said heater to control said control element.

5. A combination water heater comprising a water storage tank, an instantaneous water heater disposed within said tank, a heating medium for said heater, a water inlet for said tank, a water outlet for said tank adjacent the top of said tank, a water inlet for said heater, a water outlet for said heater, a conduit between said tank outlet and said heater inlet and a second conduit between said heater outlet and said tank inlet, whereby water may be circulated from said storage tank through said heater and back to said storage tank, a pump in one of said conduit for circulating said water, an outlet for withdrawing intensely hot water from said second conduit, said intensely hot water passing through at least part of said storage tank and through all of said heater as it passes to said outlet for intensely hot water, an opening in said conduit between said storage tank outlet and said heater inlet for withdrawing moderately hot water, a control element for controlling the supply of said heating medium to said heater, and a temperature sensitive element disposed within said heater responsive to the temperature of the water in said heater to control said control element.

6. A combination water heater comprising a water storage tank, an instantaneous water heater disposed within said tank, a non-combustible heating medium for said heater, a water inlet for said tank in the bottom of said tank, a water outlet for said tank adjacent the top of said tank, a water inlet for said heater, a water outlet for said heater, a conduit between said tank outlet and said heater inlet and a second conduit between said heater outlet and said tank inlet, whereby water may be circulated from said storage tank through said heater and back to said storage tank, a pump mounted in the conduit between said storage tank outlet and said heater inlet for circulating said water, an outlet for withdrawing intensely hot water from said second conduit, said outlet for intensely hot water being closely adjacent said heater outlet, an opening in said conduit between said storage tank outlet and said heater inlet for withdrawing moderately hot water, a control element for controlling the supply of said heating medium to said heater, and a temperature sensitive element disposed within said heater responsive to the temperature of the water in said heater to control said control element.

References Cited in the file of this patent
UNITED STATES PATENTS

| | | |
|---|---|---|
| 476,089 | Stilwell | May 31, 1892 |
| 1,425,273 | Pabodie | Aug. 8, 1922 |
| 1,723,082 | Schumann | Aug. 6, 1929 |
| 1,731,368 | Baker | Oct. 15, 1929 |
| 1,943,373 | Del Mar | Jan. 16, 1934 |
| 1,967,706 | Carroll | July 24, 1934 |
| 2,088,905 | Hartmann | Aug. 3, 1937 |
| 2,190,382 | Moore | Feb. 13, 1940 |
| 2,255,967 | Collins | Sept. 16, 1941 |
| 2,429,408 | Earley et al. | Oct. 21, 1947 |
| 2,879,749 | Lewy | Mar. 31, 1959 |

FOREIGN PATENTS

| | | |
|---|---|---|
| 48,669 | Denmark | Apr. 12, 1934 |

OTHER REFERENCES

Heating and Ventilating magazine, February 1952, vol. 50, issue 2, pages 9, 10.